US006141894A

United States Patent [19]

Thalenfeld et al.

[11] Patent Number: 6,141,894

[45] Date of Patent: *Nov. 7, 2000

[54] MERCHANDISE DISPLAY HOOK WITH PIVOTING LABEL HOLDER

[75] Inventors: John S. Thalenfeld, Dallas, Pa.; Thomas O. Nagel, Blairstown, N.J.

[73] Assignee: Trion Industries, Inc., Wilkes-Barre, Pa.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/871,208

[22] Filed: Jun. 9, 1997

[51] Int. Cl.[7] .................................................... G06F 3/00

[52] U.S. Cl. ........................ 40/642.01; 40/658; 211/57.1; 211/59.1; 248/291.1

[58] Field of Search ............................ 40/642.01, 642.02, 40/657, 658, 661.03; 211/57.1, 59.1; 248/291.1, 286.1

[56] References Cited

U.S. PATENT DOCUMENTS

| | | | |
|---|---|---|---|
| 4,540,093 | 9/1985 | Merl et al. . | |
| 4,801,116 | 1/1989 | Blankenship . | |
| 4,821,437 | 4/1989 | Abramson et al. . | |
| 5,088,606 | 2/1992 | Boas . | |
| 5,235,766 | 8/1993 | Fast et al. . | |
| 5,348,167 | 9/1994 | Jensen . | |
| 5,456,034 | 10/1995 | Lewis et al. | 40/666 |
| 5,645,175 | 7/1997 | Wood | 211/57.1 |
| 5,702,008 | 12/1997 | Thalenfeld et al. | 211/57.1 |
| 5,815,970 | 10/1998 | Thalenfeld et al. | 40/642.01 |
| 5,826,359 | 10/1998 | Thalenfeld et al. | 40/642.01 |
| 5,860,239 | 1/1999 | Thalenfeld et al. | 40/642.01 |
| 5,887,731 | 3/1999 | Thalenfeld | 211/57.1 |
| 5,901,487 | 5/1999 | Thalenfeld et al. | 40/642.01 |
| 5,941,003 | 8/1999 | Thalenfeld | 40/642.01 |
| 5,979,674 | 11/1999 | Thalenfeld | 211/57.1 |

FOREIGN PATENT DOCUMENTS 9310516 5/1993 WIPO .

*Primary Examiner*—Lynne H. Browne
*Assistant Examiner*—Andrea Chop
*Attorney, Agent, or Firm*—Schweitzer Cornman Gross & Bondell LLP

[57] ABSTRACT

A merchandise display hook provided with an improved form of pivoting label holder. A label support arm extends above a merchandise display arm and has a transversely disposed cross bar secured to an upper surface portion thereof. The cross bar provides a pivotal mount for a plastic label holding device, optionally with the end extremity of the label support serving as an abutment stop to limit rearward pivoting movement of the label holder. The label holder has a U-shaped retaining clip portion with a slot sized to accommodate the label support arm during pivotal movement of label holder on the cross bar. The slot is tapered such that the open end thereof is wider than an intermediate portion to prevent contact with the label support arm during downward rotation. The tapered slot can be formed by directing a triangular or trapezoidal-shaped tool through the retaining clip portion parallel to the panel of the label holder.

27 Claims, 2 Drawing Sheets

MERCHANDISE DISPLAY HOOK WITH PIVOTING LABEL HOLDER

RELATED APPLICATIONS

This application is related to U.S. applications Ser. Nos. 08/640,336, 08/681,008, and 08/681,012, now U.S. Pat. Nos. 5,860,239, 5,901,487, and 5,702,008, owned by Trion Industries, Inc., of Wilkes-Barre, Pa.

BACKGROUND AND SUMMARY OF THE INVENTION

Display hooks, typically mounted on apertured panel board, slotted panels, supporting cross-bars or the like are in widespread usage for displaying carded merchandise for sale. In many cases, such merchandise display hooks are combined with label-mounting means for presenting product information and pricing in association with the carded merchandise. A common form of such label-mounting means consists of arm projecting above and generally parallel to a merchandise supporting arm and mounting a label-holding device at its forward extremity, advantageously in a position directly in front of the outer end of the merchandise display hook. The label-holding device, in such cases, serves an additional function as a means for guarding the outer end of the display hook element against accidental contact.

One of the known label-mounting means for this purpose comprises a wire-like label support arm extending outward, above the merchandise support, and terminating at its outer extremity in a welded-on cross bar element. The cross bar element serves as a pivoting support for a plastic label holder, allowing the label holder to hang downward in front of the outer end of the merchandise support. The pivoting action of the label holder facilitates product removal from the associated product support. If a product being withdrawn forwardly from its display hook engages the plastic label holder, the holder can simply pivot upward out of the way as necessary to allow the product to clear. An additional advantage of pivoting label holders in general is that, with respect to product items displayed at a low level, viewing of the product information and pricing is facilitated by allowing the customer to simply reach down and tilt the label holder upwardly, rather than having to bend or crouch to read the contents of the label.

As is explained in the above-mentioned co-pending U.S. application Ser. No. 08/640,336, the cross bar is preferably welded to an outer surface of the label support arm. One of the advantages of this arrangement, over welding the cross bar directly to the end face of the label support arm, is that the welding procedure (typically electrical resistance welding) is much more reliable and cost efficient. In addition, the arrangement allows the label holder to pivot upward through a greater angle.

A known plastic label holder suitable for the above-described label mounting means is formed of extruded or co-extruded plastic materials and includes a retaining clip portion with a downwardly and forwardly-facing U-shaped recess adapted to pivotally mount on the cross bar of the merchandise display hook. The retaining clip portion of the known label holder has a straight slot usually in the center thereof to accommodate the label support arm to which the cross bar is attached. The slot allows the retaining clip portion to mount over the cross bar without interfering with the label support arm. Similarly, the slot allows the label holder to pivot upward a certain amount prior to contacting the label support arm. However, as will be further described below, the applicant has determined that when the diameter of the label support arm is sufficiently large as compared to the thickness of the material comprising the retaining clip portion, the label holder is prone to becoming caught on the end of the label support arm. This can prevent the complete downward rotation of the label holder and thus can result in the label holder being undesirably tilted or propped up. As has been discovered by the applicant, this condition occurs when the relatively thin retaining clip portion slides into a convergent gap formed between the straight bottom of the cross bar and cylindrical upper surface portions of the label support arm, when the label holder is in an upwardly-rotated position. As the label holder rotates downward, the end of the retaining clip portion can contact the label support arm and hinder further downward rotation.

The present invention is directed to a merchandise display hook of the general type described above, including a pivoted label holder arrangement, which is improved with respect to known constructions. To this end, the device of the invention includes an improved form of label holder, for mounting on a cross bar element mounted on top of a label support arm of a merchandise display hook adjacent the outer end thereof. In one form of the invention, the label holder includes a retaining clip portion with a tapered center slot which provides for pivotal mounting on a cross bar of the type described above while avoiding the problems of prior designs. The slot is tapered generally inwardly from the open end such that the open end of the slot is wider than the center. The tapered configuration ensures that the material of the retaining clip portion adjacent the open end of the slot (i.e., the end corners) can not contact the end of the label support arm during rotation. That is, the sections of the retaining clip portion which could otherwise contact the label support arm have been removed. Thus, if a retaining clip portion were to slide into the gap formed between the cross bar and the label support arm, the tapered sides of the slot would avoid contacting the label support arm and allow complete downward rotation of the label holder.

For a more complete understanding of the above and other features and advantages of the invention, reference should be made to the following detailed description of a preferred embodiment of the invention and to the accompanying drawings.

DESCRIPTION OF A PREFERRED EMBODIMENT

Figures 1, 6, 7:
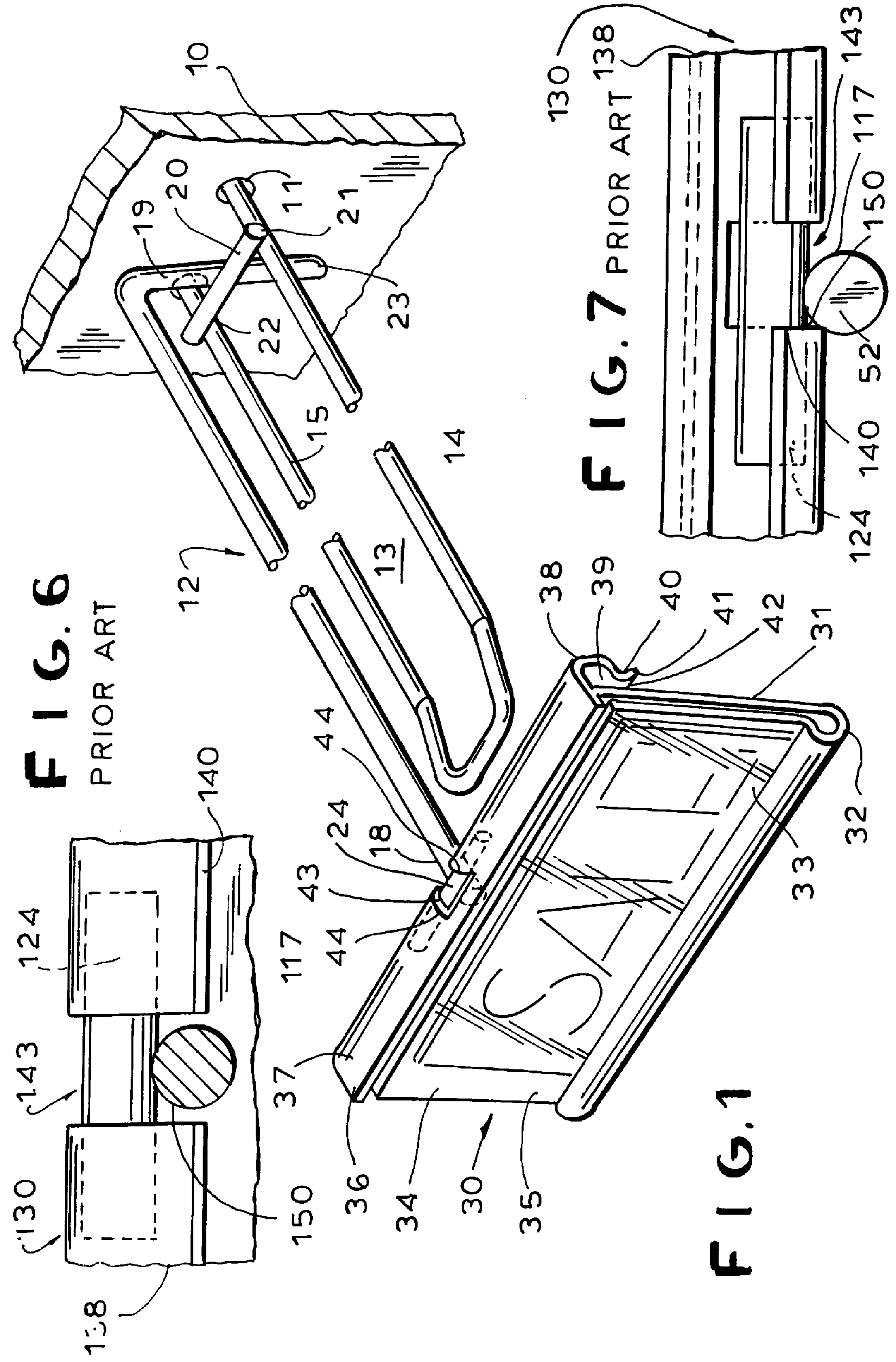
FIG. 6 PRIOR ART
FIG. 7 PRIOR ART
FIG. 1 is a perspective view of one preferred embodiment of a merchandise display hook according to the invention.
FIG. 6 is a fragmentary rear elevational view of a prior art label holder.
FIG. 7 is an enlarged, fragmentary front elevational view of the prior art label holder of FIG. 6, illustrating the label holder in an upwardly rotated position.

Referring now to the drawing and particularly to FIG. 1 thereof, the reference numeral 10 designates a section of apertured panel board provided with a grid of openings 11. Conventionally, the openings 11 are provided over the entire surface of the panel 10 and are spaced uniformly, both horizontally and vertically. A merchandise display hook 12 is conventionally provided with mounting lugs (not shown) which are inserted through an adjacent pair of apertures 11 in the board 10 in order to support the merchandise hook 12 in the manner illustrated in FIG. 1, with operative portions of the display hook extending outward from the face of the panel board. While the merchandise hook 12 is shown with mounting means suitable for an apertured panel board, it can be appreciated that other mounting means suitable for other supporting structures, such as slotted panels or supporting cross-bars, can be used.

In the form of the invention illustrated in FIG. 1, the hook 12 includes a merchandise supporting element 13 which can be in the form of a loop hook, as shown or another suitable shape. The loop hook comprises outwardly extending parallel wire supports 14, 15, joined at the outer end by a U-shaped bend 16. L-shaped mounting lugs (not shown) can be provided at the innermost end extremities of the wire sections 14, 15. A label supporting arm 17 extends above and generally parallel to the merchandise support 13, with the outer end portion 18 of the arm 17 having a circular cross section positioned preferably slightly beyond and slightly above the end extremity 16 of the merchandise supporting element 13. At its inner end, the label support arm 17 can have a downwardly extending leg 19 which is welded to a transverse cross bar 20. The cross bar 20 is in turn welded to the respective legs 14, 15 of the loop hook, as indicated at 21, 22. The lower end extremity 23 of the leg 19 projects below the level of the loop hook and is arranged to engage the front surface of the apertured panel 12, serving as a support to maintain the generally horizontal orientation of the merchandise support 13.

Figure 2:
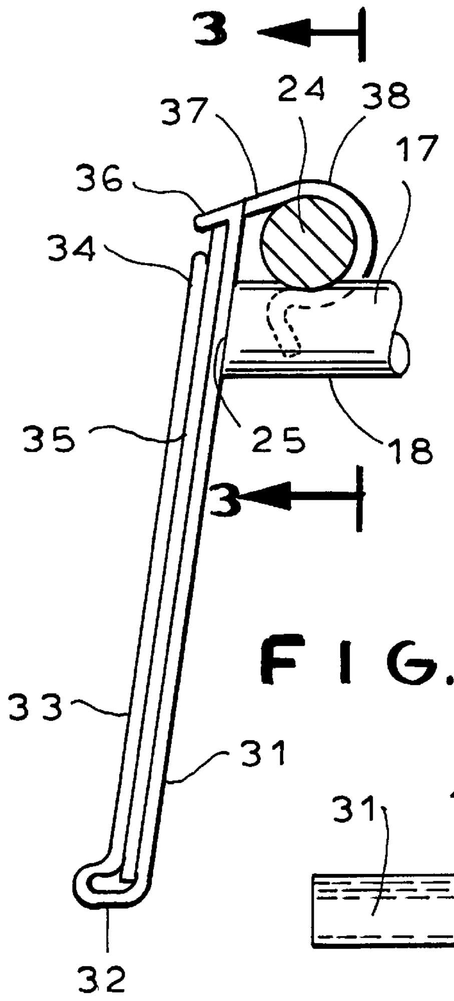
FIG. 2 is an enlarged, fragmentary side elevational view, illustrating the label-holding device in a normal or rest position.
Figure 3:
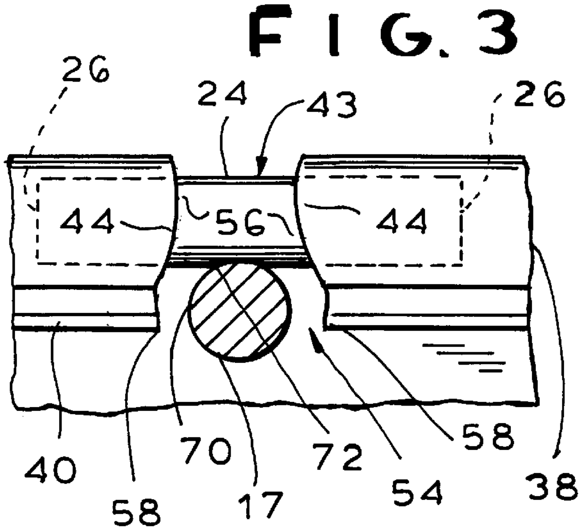
FIG. 3 is a fragmentary rear elevational view, along line 3—3 of FIG. 2.

As shown in FIGS. 1–3, a label supporting cross bar 24 is welded to the upper surface of the end portion 18 of the label support arm 17, at a point spaced at least slightly rearwardly of the outer end face 25 of the wire end section 18. As shown particularly in FIGS. 1 and 3, the cross bar 24 is mounted symmetrically on the end portion 18, with end portions 26 thereof, extending laterally on each side.

As shown in FIGS. 1–5, a plastic label holder, generally designated by the reference numeral 30, is mounted on the cross bar 24 for pivotal movement. The label holder 30 is preferably of extruded or coextruded semi-rigid, plastic construction and comprises a flat back panel 31 joined along a bottom edge 32 with a clear front panel 33. The front and back panels 33, 31, and the bottom edge connection 32 are so arranged that the front panel tends to close elastically against the front face of the back panel 31. However, by pressing rearwardly against the bottom portion 32, the upper lip 34 of the front panel can be sprung forward from the back panel 31 to accommodate the placement and retrieval of product information and pricing labels 35. Desirably, a forwardly projecting guard flange 36 is provided along the upper edge of the back panel 31, to normally overlie the upper edge 34 of the front panel.

A hinge-forming flange 37 projects rearwardly from the upper edge of the back panel 31 and includes a U-shaped retaining clip portion 38 defining a downwardly and forwardly facing U-shaped recess 39 of a size to receive the cross bar element 24. At its lower edge extremity 40, the U-shaped flange portion 38 is bent sharply downward and rearward, and supports an integral, downwardly divergent guide flange 41. Thus, by placing the guide flange 41 in contact with a cross bar 24 and pressing downward on the top of the retaining flange 37, the lower portion of the retaining flange will be cammed open by the guide flange 41. As soon as the cross bar 24 enters the chamber 39, the retaining flange 37 elastically closes so that the label holder is reliably connected to the cross bar 24 while being free to pivot with respect thereto.

As shown in FIGS. 1 and 3–5, the retaining flange portions 37, 38, and the guide flange 41, are slotted at 43, in the center of the label holder, so that inner side edges 44 of the slotted portion straddle the wire end section 18, and serve to maintain the label holder 30 properly centered with respect to the label support arm 17.

Referring to FIGS. 6 and 7, a prior art label holder 130 has a straight slot 143 with parallel sides, and a constant width along its entire length. This type of prior design can cause problems when used with a merchandise display hook having a heavy gauge label support arm 117. More specifically, when used with a merchandise display hook having a label support arm 117 with a diameter which is large relative to the thickness of the material forming the retaining clip portion 138.

As is shown in FIG. 7, when the known label holder 130 is rotated upward, an edge of the retaining clip portion 138 can enter the gap 150 formed between the label support arm 117 and the cross bar 124. Then, upon downward rotation, the lower edge extremity 140 of the retaining clip portion 130 can contact the label support arm 117, for example at a point 52, thereby preventing further downward rotation of the label holder 130 and possibly necessitating manual correction.

Figure 4:
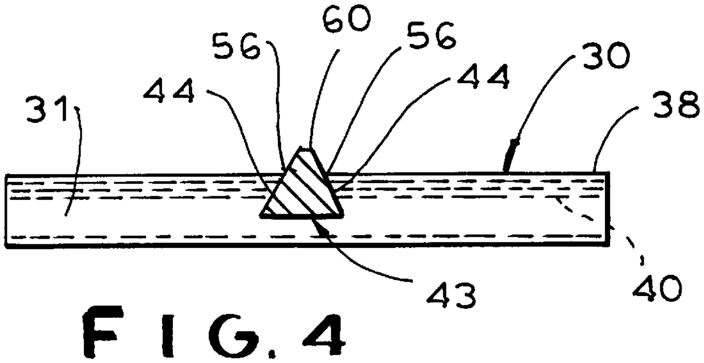
FIG. 4 is a top plan view of the label holding device according to the invention.
Figure 5:
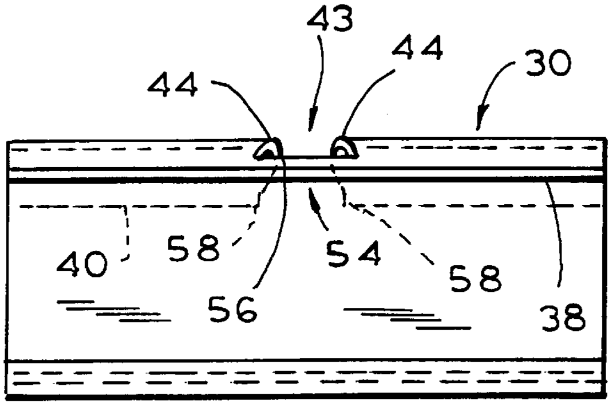
FIG. 5 is a front elevational view of the label holding device of FIG. 4.

Referring to FIGS. 3–5, the label holder 30 of the present invention has a slot 43 which is generally of a dovetailed or tapered configuration such that the open end 54 is wider than an intermediate section 56 which can be the center of the slot. The generally tapered configuration of the slot 43 eliminates the sections of the lower edge extremity 40 of the retaining clip portion which could otherwise contact the label support arm in an undesirable way. When the label holder 30 of the present invention is rotated upwardly and displaced sideways, an edge of the retaining clip portion 38 can slide into the gap 50 between the label support arm and the cross bar. However, upon downward rotation, the lower edge extremity 40 of the retaining clip portion 38, and specifically the end corners 58 of the slot 43, are prevented from contacting the label support arm 17 in a manner so as to cause the label holder 30 to be caught on or propped up by the label support arm 17.

The distance by which an edge of the retaining clip portion 38 can enter or extend into the gap 50 is a function of the radius of the label support arm 17, the thickness of the material forming the retaining clip portions 38, and the distance by which the label support arm 17 is merged or indented into the cross bar 24 as a result of the welding operation. Specifically, the distance by which the retaining clip portion 38 can enter the gap 50 can be defined by the following formula:

$$E = R - \sqrt{R^2 - (R - T - I)^2}$$

Where:

E is the distance by which the retaining clip portion 38 can extend into the gap 50 when the label holder is in an upwardly pivoted position;

R is the radius of the label support arm 17;

T is the thickness of the material forming the retaining clip portion 38; and I is the distance by which the label support arm 17 merges or indents into the cross bar 24.

The gap 50 is defined as the area between the outermost circumference 70 of the label support arm 17, the cross bar 24 and the point 72 where the label support arm 17 and the cross bar 24 join.

Preferably, the open end 54 of the slot 43 is wider than the intermediate section 56 by twice the distance by which the retaining clip portion 38 can enter the gap 50 between the label support arm 17 and the cross bar 24. Specifically, the open end 54 is preferably wider than the intermediate section 56 by at least twice the distance E, as defined by the above formula. In this manner, the label holder 30 will avoid contacting the label support arm 17 irrespective of which way the label holder 30 is displaced.

The generally tapered slot 43 of the label holder 30 can be formed by, for example cutting, the interior corners 58 of the lower edge extremity 40 of the retaining clip portion 38 defining the open end 54 of a previously formed straight slot (such as slot 143 of FIG. 6). However, to advantage the tapered slot can be formed more efficiently by providing a tool 60 such as a punch having, as shown, a triangular- or trapezoidal-shaped cross section (or another suitable shape) and by directing the tool 60 through a preferably contiguous (i.e., non-slotted) retaining clip portion 38 such that the least amount of material is removed from the retaining clip portion 38 at a point farthest from the back panel 31 of the label holder 30. This can be accomplished by aligning the tool 60 as shown, with the widest portion of the cross section closest to the back panel 31 of the label holder 30.

Figure 8:
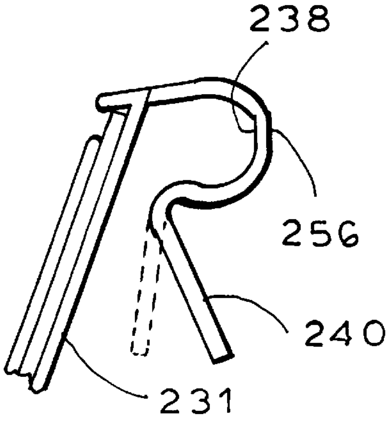
FIG. 8 is an enlarged, fragmentary side elevational view of a label holder, illustrating the lower edge extremity and an intermediate section of the retaining clip portion being substantially equidistant from the back panel of the label holder.

As shown, the end extremity 40 of the retaining clip portion 38 can be closer to the back panel 31 than the intermediate section 56. With this configuration, the tool 60 can be directed through the contiguous retaining clip portion 38 in a direction parallel to the back panel 31 to achieve the desired slot shape. However, with another configuration (shown in FIG. 8) the lower edge extremity 240 of the retaining clip portion 238 and the intermediate portion 256 thereof can be equidistant from the back panel 231. With this alternative configuration, a slot of the proper slot shape can be formed by forcibly urging the lower edge extremity closer to the back panel (as shown in dotted lines in FIG. 8) while the tool is directed substantially parallel to the back panel. The proper slot shape can also be achieved by directing the tool through the retaining clip portion at an angle with respect to the back panel such that a relatively wide section of the tool passes through the lower edge extremity and a relatively narrow section passes through the intermediate section. In addition, a combination of temporarily repositioning the lower edge extremity and directing the tool at an angle can be used to achieve the desired result.

This method will produce, in one step, a slot 43 with a shape and cross section apparent in FIGS. 3 and 4, respectively. Due to the arcuate nature of the retaining clip portion 38, the slot 43 will have an open end 54 which is wider than the intermediate portion 56, as described above.

It should be understood, of course, that the specific form of the invention herein illustrated and described is intended to be representative only. In this respect, the specific form of the merchandise display hook employing the new label-mounting feature may take any of a variety of forms. Likewise, the plastic label holder itself may be constructed in various ways consistent with the present invention. Accordingly, reference should be made to the following appended claims in determining the full scope of the invention.

We claim:

1. A merchandise display hook with pivoting label holder, which comprises, (a) an outwardly extending label support arm having an outer end extremity formed with a circular cross section including an arcuate top surface, (b) means associated with an inner end of said label support arm for mounting said arm on a support structure, (c) a cylindrical cross bar member of circular cross section having an arcuate bottom surface fixed generally tangentially to said arcuate top surface of said outer end extremity of said label support arm and extending transversely thereof for the support of a label holder, said cross bar member forming a gap between said arcuate top surface of said outer end extremity and the bottom surface of said cross bar member in an area vertically above said outer end extremity and within spaced apart vertical planes tangent with surfaces of said outer end extremity, (d) a label holder pivotally mounted on said cross bar member and having a front panel and a back panel for retaining a product information label therebetween, (e) said label holder including a forwardly facing U-shaped cross bar engaging clip portion with an opening formed by the U-shape, of the U-shaped clip portion facing said back panel for engaging said cross bar member on opposite sides of said label support arm, and a guide flange, connected to a lower edge extremity of said cross bar engaging clip portion, extending rearwardly away from said back panel and downwardly away from said opening of said U-shaped clip portion for assisting in mounting said label holder on said cross bar member, (f) said cross bar engaging clip portion and said label holder being freely pivotally mounted on said cross bar member, (g) said cross bar engaging clip portion and said guide flange forming a slot sized to accommodate the label support arm, and sized to allow said free pivotal movement of said label holder; and (h) said slot having end corners located on an edge extremity of said guide flange, which end corners define an opening which is wider than an intermediate portion of said slot such that, if said label holder is displaced laterally into said gap when said label holder is pivoted upwardly, said end corners are prevented from lockingly engaging said label support arm during downward pivoting of said label holder.

2. A merchandise display hook according to claim 1, wherein said slot is smoothly tapered from said opening of said slot to said intermediate portion.

3. A merchandise display hook according to claim 1, wherein said opening of said slot is wider than said intermediate portion by a distance at least equal to approximately twice a distance E defined by $$E = R - \sqrt{R^2 - (R - T - I)^2}$$

Where:

E is the distance by which said cross bar engaging clip portion can extend into said gap;

R is an outer radius of said label support arm;

T is a thickness of the material forming said cross bar engaging clip portion; and I is a distance by which said label support arm merges into said cross bar member.

4. A method of manufacturing a merchandise hook comprising the steps of:

(a) providing an outwardly-extending label support arm having an outer end extremity with a circular cross section including an arcuate top surface;

(b) affixing a cylindrical cross bar member of circular cross section having an arcuate bottom surface generally tangentially to said arcuate top surface of said end extremity of said label support arm, said cross bar member forming a gap between said arcuate top surface of said outer end extremity and the bottom surface of said cross bar member in an area vertically above said outer end extremity and within spaced apart vertical planes tangent with surfaces of said outer end extremity;

(c) providing a label holder with a retaining clip portion sized and shaped for free pivotal mounting on said cross bar member, and a downwardly and rearwardly directed guide flange, connected to a lower edge extremity of said retaining clip portion for assisting in mounting said label holder on said cross bar member; and (d) forming a slot in said retaining clip portion and said guide flange sized to accommodate said label support arm during rotation of said label holder;

(e) said slot having end corners located at an edge extremity of said guide flange, which end corners define an opening which is wider than an intermediate portion of said slot such that, if said label holder is displaced laterally into said gap when said label holder is pivoted upwardly, end corners of said slot are prevented from lockingly engaging said label support arm during downward pivoting of said label holder.

5. The method according to claim 4, wherein said slot-forming step further comprises forming a slot which is smoothly tapered from said opening of said slot to said intermediate portion.

6. The method according to claim 5, wherein said tapered slot-forming step further comprises directing a tool through said retaining clip portion and said guide flange in such a manner as to remove a least amount of material from said retaining clip portion at a point farthest from a back panel of said label holder.

7. The method according to claim 6, wherein said retaining clip portion comprises a downwardly and forwardly-facing arcuate U-shaped portion, and wherein said step of directing a tool through said retaining clip portion and said guide flange further comprises using a tool with a tapered cross section such that the tool, in conjunction with the arcuate nature of the retaining clip portion, forms said tapered slot having said opening of said slot which is wider than said intermediate portion.

8. The method according to claim 7, wherein (a) said cross section of said tool has a first width and a second width less than said first width; and (b) said tool is aligned such that said first width is closer to said back panel of said label holder than said second width.

9. The method according to claim 8, wherein said first width of said cross section is aligned to pass through said guide flange to form said opening of said slot of said slot and said second width is aligned to pass through an intermediate section of said retaining clip portion.

10. The method according to claim 9, wherein said cross section of said tool is at least partially trapezoidal-shaped.

11. The method according to claim 10, wherein said first width of said cross section is at least equal to approximately twice a distance E, defined by $$E = R - \sqrt{R^2 - (R - T - I)^2}$$

Where:

E is the distance by which the retaining clip portion can extend into said gap between said cross bar member and said label support arm when the label holder is in an upwardly pivoted position;

R is the radius of the label support arm;

T is the thickness of the material forming the retaining clip portion; and

I is the distance by which the label support arm merges or indents into the cross bar member.

12. The method according to claim 10, wherein:

(a) a portion of said guide flange and said intermediate section are substantially equidistant from said back panel of said label holder; and (b) said step of directing a tool further comprises forcibly urging said portion of said guide flange closer to said back panel than said intermediate section.

13. The method according to claim 12, further comprising directing said tool in a direction substantially parallel to said back panel.

14. The method according to claim 10, wherein:

(a) a portion of said guide flange and said intermediate section are substantially equidistant from said back panel of said label holder; and (b) said tool is directed at an angle with respect to said back panel such that said first width of said tool passes through said portion of said guide flange and such that said second width passes through said intermediate section.

15. The method according to claim 10, wherein said tool is directed substantially parallel to said back panel.

16. The method according to claim 9, wherein said cross section of said tool is at least partially triangular-shaped.

17. A merchandise display hook with pivoting label holder, which comprises, (a) an outwardly extending label support arm having an outer end portion with a circular cross section, (b) means associated with an inner end of said label support arm for mounting said arm on a support structure, (c) a cross bar member of circular cross section fixed generally tangentially to an upper surface of said outer end portion of said label support arm and extending transversely thereof for the support of a label holder, said cross bar member forming a gap between a laterally outer surface portion of said label support arm and a lower surface portion of said cross bar member located directly above said laterally outer surface portion in a region where said label support arm and said cross bar member join, (d) a label holder pivotally mounted on said cross bar member and having a front panel and a back panel for retaining a product information label therebetween, (e) said label holder including a forwardly facing U-shaped cross bar engaging clip portion with an opening formed by the U-shape, of the U-shaped clip portion, facing said back panel for engaging said cross bar member on opposite sides of said label support arm, and, connected to a lower edge extremity of said cross bar engaging clip portion, a guide flange extending rearwardly away from said back panel and downwardly away from said opening of said U-shaped clip portion for assisting in mounting said label holder on said cross bar member, (f) said cross bar engaging clip portion and said label holder being freely pivotally mounted on said cross bar member, (g) said cross bar engaging clip portion and said guide flange forming a slot sized to accommodate the label support arm, and sized to allow said free pivotal movement of said label holder;

(h) said slot having end corners located on an edge extremity of said guide flange, which end corners define an opening which is wider than an intermediate portion of said slot such that, if said label holder is displaced laterally into said gap, said end corners do not lockingly engage said label support arm during downward rotation of said label holder; and (i) said slot being smoothly tapered from said opening of said slot to said intermediate portion.

18. A method of manufacturing a merchandise hook comprising the steps of:

(a) providing an outwardly-extending label support arm having an end portion with a circular cross section;

(b) affixing a cross bar member generally tangentially to an upper surface of said end portion of said label support arm, said cross bar member forming a gap between a laterally outer surface portion of said label support arm and a lower portion of said cross bar member located directly above said laterally outer surface portion in a region where said label support arm and said cross bar member join;

(c) providing a label holder with a retaining clip portion sized and shaped for free pivotal mounting on said cross bar member, and connected to a lower edge extremity of said retaining clip portion, a downwardly and rearwardly directed guide flange for assisting in mounting said label holder on said cross bar member;

(d) forming a slot in said retaining clip portion and said guide flange sized to accommodate said label support arm during rotation of said label holder, said slot-forming step comprising directing a tool through said retaining clip portion and said guide flange in such a manner as to remove a least amount of material from said retaining clip portion at a point farthest from a back panel of said label holder;

(e) providing said slot with an open end which is wider than an intermediate portion thereof such that, if said label holder is displaced laterally into said gap, end corners of said slot do not lockingly engage said label support arm during downward rotation of said label holder; and (f) said slot-forming step forming a slot which is smoothly tapered from said open end to said intermediate portion.

19. The method according to claim 18, wherein said retaining clip portion comprises a downwardly and forwardly-facing arcuate U-shaped portion, and wherein said step of directing a tool through said retaining clip portion and said guide flange further comprises using a tool with a tapered cross section such that the tool, in conjunction with the arcuate nature of the retaining clip portion, forms said tapered slot having said open end which is wider than said intermediate portion.

20. The method according to claim 19, wherein (a) said cross section of said tool has a first width and a second width less than said first width; and (b) said tool is aligned such that said first width is closer to said back panel of said label holder than said second width.

21. The method according to claim 20, wherein said first width of said cross section is aligned to pass through said guide flange to form said open end of said slot and said second width is aligned to pass through an intermediate section of said retaining clip portion.

22. The method according to claim 21, wherein said cross section of said tool is at least partially trapezoidal-shaped.

23. The method according to claim 22, wherein said first width of said cross section is at least equal to approximately twice a distance E, defined by $$E = R - \sqrt{R^2 - (R - T - I)^2}$$

Where:

E is the distance by which the retaining clip portion can extend into said gap between said cross bar and said label support arm when the label holder is in an upwardly pivoted position;

R is the radius of the label support arm;

T is the thickness of the material forming the retaining clip portion; and

I is the distance by which the label support arm merges or indents into the cross bar.

24. The method according to claim 22, wherein:

(a) a portion of said guide flange and said intermediate section are substantially equidistant from said back panel of said label holder; and (b) said step of directing a tool further comprises forcibly urging said portion of said guide flange closer to said back panel than said intermediate section.

25. The method according to claim 24, further comprising directing said tool in a direction substantially parallel to said back panel.

26. The method according to claim 22, wherein:

(a) a portion of said guide flange and said intermediate section are substantially equidistant from said back panel of said label holder; and (b) said tool is directed at an angle with respect to said back panel such that said first width of said tool passes through said portion of said guide flange and such that said second width passes through said intermediate section.

27. The method according to claim 22, wherein said tool is directed substantially parallel to said back panel.

* * * * *